(12) United States Patent
Roll et al.

(10) Patent No.: US 6,410,776 B1
(45) Date of Patent: Jun. 25, 2002

(54) METHOD FOR PRODUCING RESOLS

(75) Inventors: Willi Roll, Altenberge; Axel Bottcher, Wesel; Walter Napp, Duisburg; Peter Fricke, Kevelaer, all of (DE)

(73) Assignee: Bakelite AG (DE)

( * ) Notice: Subject to any disclaimer, the term of this patent is extended or adjusted under 35 U.S.C. 154(b) by 0 days.

(21) Appl. No.: 09/647,422

(22) PCT Filed: Dec. 30, 1999

(86) PCT No.: PCT/EP99/10477

§ 371 (c)(1),
(2), (4) Date: Oct. 4, 2000

(87) PCT Pub. No.: WO00/44802

PCT Pub. Date: Aug. 3, 2000

(30) Foreign Application Priority Data

Jan. 29, 1999 (DE) .......................................... 199 03 487

(51) Int. Cl.⁷ ............................................. C07C 261/00
(52) U.S. Cl. .......................... 560/25; 528/163; 528/165; 528/232; 528/254
(58) Field of Search .............................. 560/25; 528/103

(56) References Cited

U.S. PATENT DOCUMENTS

| 4,131,582 A | * | 12/1978 | Kako et al. |
| 4,454,298 A | * | 6/1984 | Koyama et al. |
| 4,558,089 A | * | 12/1985 | Koyama et al. |
| 5,137,931 A | * | 8/1992 | Okumura et al. |
| 5,708,121 A |   | 1/1998  | Parks et al. |

FOREIGN PATENT DOCUMENTS

| EP | 0890613 |   | 1/1999 |
| GB | 1361045 | * | 7/1974 |
| JP | 042291  | * | 4/1978 |
| JP | 202135  | * | 11/1984 |
| PL | 163046  | * | 2/1994 |

\* cited by examiner

Primary Examiner—Paul J. Killos
(74) Attorney, Agent, or Firm—Bierman, Muserlian and Lucas

(57) ABSTRACT

The invention relates to a process for the preparation of resols by reacting phenolic compounds with aldehydes with catalysis by metal salts whose cation can easily be precipitated as low-solubility salts in industrial processes. In this process, a dispersant is added to the reaction mixture comprising phenolic compound, aldehyde and metal salt before, during or after the condensation reaction, and a complexing agent is admixed after the condensation reaction is complete and after the dispersant has been admixed. The resultant resins are transparent even after neutralization using sulphuric acid.

10 Claims, No Drawings

METHOD FOR PRODUCING RESOLS

This application is a 371 of PCT/EP99/10477 filed Dec. 30, 1999.

The invention relates to the preparation of phenolic resins prepared with the aid of metal salts which catalyze the formation of resols and whose cations can easily be precipitated as low-solubility salts in industrial processed.

Resols of this type are preferred for various areas of application owing to their better moisture resistance.

Examples of basic salts of this type are basic alkaline earth metal salts, in particular calcium hydroxides. These salts have the advantage over the alkali metal hydroxides usually employed that the resins prepared in this way have a very low content of free phenol and that the products produced from these resins have better moisture resistance. After the condensation, the salts can be precipitated from the aqueous solution by addition of dilute sulphuric acid, carbon dioxide, ammonium sulphate, ammonium phosphates or ammonium carbonates and separated off. This gives resins which are virtually ash-free.

It is a disadvantage of these resins that the insoluble precipitates formed in their preparation must be filtered off in a complex process, since otherwise blockage of the nozzles can occur during processing of the resins by spraying and can thus result in problems during processing.

Filtration of the resins is firstly complex and secondly associated with considerable loss of resins. In addition, disposal of filter cakes containing phenolic resins to landfill is expensive and represents an environmental problem.

A solution to these problems are phenolic resins in which calcium ions are bound to the resins in the form of complexes with the aid of ammonia or amines, as disclosed in EP-A 0 198 130 and EP-A 0 190 468. However, these complexes have only moderate stability. Within a few hours, precipitates form in the corresponding resins solution, and consequently these can only be employed if they are processed further immediately after the complexing. This is generally not the case, since the resin manufacturer is not the processor.

In addition, it has been found that calcium carbonate present in technical-grade calcium hydroxide likewise interferes with the processing of these resins and promotes further precipitation.

It is therefore an object of the invention to provide resols which are simple to prepare and which give products having good moisture resistance. It is a further object of the invention that these resols have no interfering precipitations no neutralization with the usual neutralizing agents used, such as sulphuric acid, carbon dioxide, ammonium, sulphate, ammonium phosphates or ammonium carbonate, and in which impurities of industrial products, such as, for example, calcium carbonate, have no interfering effects.

The object it achieved by a process according to claims 1 to 6. The resins prepared using the process according to the invention are used, in particular, as binders for the production of acoustic and thermal insulating materials, wood materials, foams and laminates according to, claims 7 to 10.

In phenolic resins condensed with the aid of alkaline earth metal ions, it has been attempted to keep the alkaline earth metal ions in solution with the aid of complexing agents in such a way that a good shelf life is achieved. This was not successful. As a corresponding comparative example shows, addition of conventional complexing agents to a resin solution prepared with the aid of alkaline earth metal ions did not results in the desired effect (if complexing of the metal ions.

EP-A 890 613 teaches to mix a urea-modified phenolic resin which has been condensed with the aid of alkaline earth metal hydroxide with a chelating agent and a polymeric anionic dispersant after the condensation reaction in a single working step. On repeating this teaching (Example 7), however, it was found that a precipitate is nevertheless formed and must be filtered off. In addition, the products obtained have a dark colour which restricts their use in all cases where a pale hue is desired, such as, for example, on use in the mineral wool industry.

Surprisingly, however, it has been found that mixing of the resin solution of a phenolic resin prepared with the aid of alkaline, earth metal hydroxide with a commercially available complexing agent allows complexing of the metal ions to be achieved if the resin solution has already been intensively mixed with a dispersant. The resin here is clearly in dispersed form. The resin solution formed in this way is stable. No precipitate forms. Even on contact with $CO_2$ or even on passing $CO_2$ into corresponding solutions, no alkaline earth metal carbonate precipitates. On the contrary, alkaline earth metal carbonate particles present in the resin solution dissolved within a short time.

It is furthermore surprisingly that the metal ions in the resins treated in this way are immobilized in such a way that they are apparently no longer available for later reactions with water. The products produced using the resins prepared in accordance with the invention are distinguished by very good moisture resistance.

The condensation reaction of phenolic compounds is carried out in the manner known per se for the preparation of resols by heating the reactants in aqueous solution until the desired degree of condensation has been achieved. The condensation partners employed can be any phenolic compounds and aldehydes known for the preparation of phenolic resins.

Phenolic compounds are, in particular, phenol, but also aliphatically or aromatically substituted phenols, and polyhydric phenols. Examples of these are cresols, xylenols, tert-octylphenol, naphthols, p-phenylphenol, bisphenols and resorcinols, but also natural products, such as, for example, cardenol, cardol and tannin. The phenolic compounds can be employed as individual compounds or in any desired mixtures with one another.

Aldehydes which can he employed are all compounds of the general formula R—CHO. Examples are formaldehyde, acetaldehyde, propionaldehyde, n-butyraldehyde and isobutyraldehyde, glyoxal and furfural. The preferred aldehyde is formaldehyde, which is employed as such or in the form of a formaldehyde-eliminating substance, such as, for example, paraformaldehyde or trioxane. The preferred form of addition is an aqueous solution having a formaldehyde content of greater than 30% (formalin). The molar ratio between phenolic compound and aldehyde can be selected as desired in the range from 1:1.2 to 1:4.

Catalysts which can be employed in the process according to the invention are metal salts which catalyze the formation of resole and whose cations can easily be precipitated as low-solubility salts in industrial processes. Examples are magnesium oxide, magnesium hydroxide, the hydroxides of the alkaline earth metals calcium, strontium and barium, and salts thereof with weak acids, but also weakly basic salts of the transition metals, such as, for example, zinc acetate and manganese octanoate. The preferred catalyst is calcium hydroxide.

The amount of catalyst employed is in the range from 1 to 15% by weight preferably in the range from 2 to 6% by weight, based on the amount of phenolic compound employed.

The dispersants employed can be any commercially available substances which are marketed as dispersants, emulsifiers, wetting agents or anti-deposition agents for aqueous systems. Examples are ammonium acrylates, phosphonium salts, polyalkoxy compounds, such as, for example, alkylarylpolyethylene glycols, salts of fatty acids, in particular of alkylarylcarboxylic acids, alkylbenzenesulphonates, alkylnaphthalenesulphonates or sulphonates of products of the condensation of naphthalene or alkylnaphthalene with formaldehyde, alkyl sulphates or betaines. Preference is given to ammonium polyacrylates or alkylnaphthalenesulphonates.

In an amount of from 0.05 to 5%, based on the phenolic compound employed, they are added to the reaction mixture comprising phenolic compounds, aldehyde and catalyst and mixed intensively. They can be added either before, during or after the condensation reaction. In the latter case, the dispersant can be added to the reaction mixture before the neutralization or thereafter. The crucial factor in all cases is that the resin is in some type of dispersed form, with the aid of the added dispersant, before addition of the chelating agent. This generally requires intensive mixing of the reaction mixture with the dispersant for several minutes, at least 10 minutes in customary stirred reactors used in the preparation of the resins, before the complexing agent is added.

Complexing agents which can be employed are all water-soluble compounds known per se which form chelates with metal ions. Examples are ketocarboxylic acids, dimethylglyoxime, aminopolycarboxylic acids, diethylenetriaminepentaacetic acid, but in particular nirilotriacetic acid (NTA) and ethylenediaminetetraacetic acid (EDTA).

They are preferably employed in an amount which is stoichiometrically sufficient to complex the metal ions of the catalysts employed, an excess of up to 10% preferably being selected in order to achieve a satisfactory complexing race. A further excess does no harm, but is inappropriate for economic reasons. However, addition of a slightly sub-stoichiometric amount of complexing agent also results in transparent resin solution.

The complexing agent is added after the condensation reaction is complete and after the freshly prepared resin solution has been mixed with the dispersant. The complexing agent can likewise be added to the resin solution either before or after neutralization of the reaction mixture.

If the complexing agent is added before the neutralization, precipitations do not form even on neutralization with acids which per se lead to low-solubility precipitations of the corresponding metal salts.

If the complexing agent is added after neutralization with all acid which has already led to precipitation, this precipitation dissolves within a short time, and an infinitely water-dilutable resin solution forms. Likewise, low-solubility salts present in the resin solution, which are in the form of impurities in the technical-grade qualities employed of the metal salts used as catalyst, dissolve after a short time.

These resin solutions have a shelf life of several weeks without any precipitations of insoluble metal salts appearing. They can thus be processed in common processes, accordingly also in spray processes, even after extended storage and transport times, without the fear of precipitating salts resulting in blockage of the nozzles.

The resin solutions are transparent and exhibit excellent impregnation behaviour. They can be cured in the conventional manner for standard resols i.e. they are self-curing on exposure to heat, but can also be employed in combination with curing agents known per se, in particular with acids. They can likewise, as is also known of standard resols, be combined with other, preferably water-soluble, thermosetting and thermoplastic resins. Owing to these properties, they are particularly suitable for the production of laminates and teams.

The cured resins exhibit excellent mechanical strengths and very good moisture resistance. They are therefore preferably suitable for the production of acoustic and thermal insulating materials and wood materials.

EXAMPLES

The amounts given in the Examples are in each case parts by weight (pbw). The dispersants employed in Examples 1 and 5 is an ammonium polyacrylate (Nopcosperse®). The dispersant employed in Example 2 is diisobutylnaphthalenesulphonate (Nekal® BX).

Example 1

100 pbw of phenol are mixed in a reactor with 50 pbw of water and 4 pbw of slaked lime and heated to 70° C. 237.5 pbw of 45% formalin solution are then added, and the reaction mixture is condensed at 70° C. to a water dilutability of 1:10. 62.7 pbw of urea are then added, followed by 0.5 pbw of dispersants.

After the reaction mixture has been stirred for 2 hours and cooled, 1 pbw of complexing agent (Na salt of ethylenediaminetetraacetic acid) in added, and the mixture is stirred for a further 15 minutes.

The reaction mixture is then neutralized to pH 7 using dilute sulphuric acid. The reaction solution remains clear. No precipitations are observed. Even after a storage time of 4 weeks at room temperature, no precipitations are observed.

Example 2

100 pbw of phenol are mixed in a reactor with 50 pbw of water and 5 pbw of slaked lime and heated to 70° C., 237 pbw of 45% formalin solution are then added, and the reaction mixture is condensed at 70° C. to a water dilutability of 1:10.

After the mixture has been cooled to 23° C., 2 pbw of a 50% strength aqueous solution of Nekal® BX are added as dispersants and the mixture is stirred vigorously for 30 minutes. 10 pbw of a 10% strength aqueous solution of the Na salt of nitrilotriacetic acid are then added, and the mixture is homogenized.

The reaction mixture is then neutralized to pH 7 using dilute sulphuric acid. The reaction solution remains clear. Even after 4 weeks (storage at room temperature), no precipitations are observed.

Example 3 (comparative example)

Example 1 is repeated, the only change being that no dispersants is added.

On neutralization of the reaction mixture using sulphuric acid, calcium sulphate deposits in the form of a microcrystalline precipitate.

Example 4 (comparative example)

Analogously to Example 1,100 pbw of phenol and 250 pbw of 45% formalin are condensed with one another at 70% in a reactor. The catalyst employed is 6.7 pbw of 50% strength sodium hydroxide solution. After the condensation 15 pbw of urea are added to the reaction mixture, and the mixture is subsequently neutralized using dilute sulphuric acid.

Example 5 (comparative example)

Analogously to Example 4, 100 pbw of phenol and 210 pbw of 45% formalin are condensed with one another. The catalyst employed is 7.5 pbw of triethylamine. After the condensation, 75.8 pbw of urea are added to the reaction mixture, and the mixture is subsequently neutralized using dilute sulphuric acid.

Test results for the resins from Examples 1–5

The resin are analyzed in a conventional manner. In addition the flexural strength of corresponding test bars is determined. In order to produce the test bars, each of the resin solutions is adjusted to a solids content of 40%. 10 pbw portions of these solutions are each mixed with 100 pbw of quartz sand, and the mixture is introduced into moulds (170×22×22 mm) and cured in these moulds for 2 hours at 180° C. in the oven. The flexural strength is tested;
  a. in the dry state
  b. in the wet state after storage for 6 hours in water at 100° C. and cooling for 1 hour in running water at a maximum of 20° C.

The results obtained are shown in Tables 1 and 2 below:

TABLE 1

|  | (analyzed) | | | | |
| --- | --- | --- | --- | --- | --- |
|  | Example 1 | Example 2 | Example 3 | Example 4 | Example 5 |
| Refractive index | 1.4550 | 1.4742 |  | 1.4650 | 1.4540 |
| Solids content [%] | 45.0 | 45.2 | 43.0 | 49.0 | 47.0 |
| Free phenol [%] | <0.3 | 0.42 | <0.3 | <0.5 | <0.7 |
| Free formaldehyde [%] | <0.5 | 8.2 | <0.5 | 7.0 | <0.5 |
| pH | 7 | 7 | 7 | 8.8 | 8.6 |
| Water solubility | ∞ | ∞ | ∞ | ∞ | ∞ |
| B time at 130° C. [min] | 7 | 4 | 13 | 5 | 14 |

TABLE 2

| | (flexural strength [MPa]) | |
| --- | --- | --- |
|  | dry | wet |
| Example 1 | 8.1 | 7.9 |
| Example 2 | 8.7 | 8.1 |
| Example 3 | 7.9 | 6.5 |
| Example 4 | 7.5 | 4.1 |
| Example 5 | 7.9 | 5.1 |

Example 6

Analogously to Example 1, 100 pbw of phenol are condensed with 142 pbw of 45% formalin. The catalyst used is 5 pbw of barium hydroxide. After the condensation, 0.5 pbw of dispersant is added, and the reaction mixture is stirred for 2 hours. 102 pbw of the Na salt of ethylenediaminetetraacetic acid are then added, and the mixture is stirred for a further 30 minutes. 0.5 pbw of alkylsulphonic acid, 5 pbw of pentane and 5 pbw of p-toluenesulphonic acid are subsequently added, and the mixture is foamed at 60° C. The compressive strength of the foam is determined by the Chatillon method. The result is given in Table 3.

Example 7 (comparative example)

A resin is prepared analogously to Example 6, the only change being that no dispersants is added. On addition the mixture to lit foamed, an insoluble barium salt of p-toluenesulphonic acid precipitates out and slowly deposits in the reaction mixture. The resultant foam is thus inhomogeneous.

TABLE 3

| (compressive strength of the foams [Pa]) | |
| --- | --- |
| Example 5 | 70 |
| Example 6 | 56 |

Example 8 (comparative example)

100 pbw of phenol are mixed with 27.3 pbw of water and 8.8 pbw of slaked lime in a reactor and heated to 70° C. 227 pbw of 45% formalin solution are then added, and the reaction mixture is condensed at 70° C. to a water dilutability of 1:10. After the mixture has been cooled to 60° C., 32 pbw of water and 54.7 pbw of urea are added. The mixture is then immediately cooled to 49° C. and held at this temperature for 30 minutes.

After the mixture has been cooled to 23° C., 0.5% APBT (1% at Bayhibit® AM 50%) and 0.15% sodium ligninsulphonate (Vanioperac® CB) are added shortly one after the other with vigorous stirring.

Analysis of the resultant resin:

$n_D$ value: 1.4635 pH: 8.8

Density at 20° C.: 1.195 g/cm$^3$

Free formalin: 0.5%

Free phenol; 0.33%

Dry resin: 46.1%

Water solubility: infinite, but formation of a precipitate which settles

Colour: black brown.

What is claimed is:

1. Process for the preparation of resols by reacting phenolic compounds with aldehydes with catalysis by metal salts whose cations, can easily be precipitated as low-solubility salts in industrial processes, characterized in that a dispersant is added to the reaction mixture comprising phenolic compound, aldehyde and metal salt before, during or after the condensation reaction, and a complexing agent is admixed after the condensation reaction is complete and after the dispersants has been admixed.

2. Process according to claim 1, characterized in that the metal salt is calcium hydroxide or magnesium hydroxide.

3. Process according to claim 1, characterized in that the dispersants is already added to the reaction mixture before the condensation reaction.

4. Process according to claim 1, characterized in that the dispersants is added to the reaction mixture after the condensation reaction has taken place, and in that the reaction mixture is neutralized before the addition of dispersants and complexing agent.

5. Process according to claim 1, characterized in that the dispersants is added to the reaction mixture after the condensation reaction has taken place, and in that the reaction mixture is neutralized after the addition of dispersants and complexing agent.

6. Process according to claim 1, characterized in that the amount of dispersant is 0.05–5%, based on the phenolic compound.

7. In the production of acoustic and thermal insulating materials, the improvement comprising using as the resol, that produced by the process of claim 1.

8. In the production of wood materials, the improvement comprising using as the binder, a resol produced by the process of claim 1.

9. In the production of foams, the improvement comprising using a resol produced by the process of claim 1 for the production thereof.

10. In the production of laminates, the improvement comprising using a resol produced by the process of claim 1.

* * * * *